United States Patent [15] 3,680,763
Ludder [45] Aug. 1, 1972

[54] CONTAINER PARISON
[72] Inventor: Rodney E. Ludder, Glen Head, N.Y.
[73] Assignee: Owens-Illinois, Inc.
[22] Filed: July 2, 1970
[21] Appl. No.: 51,802

[52] U.S. Cl. ............................ 229/1.5 B, 215/1 C
[51] Int. Cl. ...................................... B65d 1/10
[58] Field of Search .............. 229/1.5 B; 215/1 C; 220/DIG. 13, 66, 70

[56] References Cited

UNITED STATES PATENTS

| 3,139,824 | 7/1964 | Derrickson | 215/1 C UX |
| 3,403,804 | 10/1968 | Colombo | 215/1 C X |
| 2,099,055 | 11/1937 | Ferngren | 215/1 C UX |
| 2,882,818 | 4/1959 | Vowles | 215/1 UX |
| 3,417,892 | 12/1968 | Schweiger | 215/1 C |
| 3,442,420 | 5/1969 | Edwards | 229/1.5 B X |
| 3,145,619 | 8/1964 | Ozanne | 220/97 R X |
| 2,986,300 | 5/1961 | Parrish | 220/97 R X |

FOREIGN PATENTS OR APPLICATIONS 798,141   11/1968   Canada .......................... 215/1 C Primary Examiner—Donald F. Norton
Attorney—Brooks, Haidt & Haffner

[57] ABSTRACT

Thin-walled, nestable, generally cup-shaped preform or parison of thermoplastic material having a protuberance on its bottom wall portion which provides a transversely extending, generally lateral facing ridge surface for use in pivotally orienting the parisons as they are conveyed one-at-a-time at relatively high speed into a blow-molding machine for final forming to non-nestable container shape; parisons have localized printed or thickened surface areas, and such pivotal orienting causes these areas to face precisely, as desired, with respect to particular local surface areas of machine mold cavity in which they are received; screw type conveyor moves single line of upright parisons laterally toward machine, urging their respective bottom ridge surfaces against fixed aligning track which promotes desired pivotal movement of each parison and retains resulting alignment; vacuum applied through machine mandrel by which each parison is picked up and held promotes any necessary final, incremental orienting as parison bottom ridge seats itself against transversely extending, mating configuration on mandrel bottom; alternative parison embodiments respectively provide downwardly or upwardly projecting bottom ridge.

6 Claims, 11 Drawing Figures

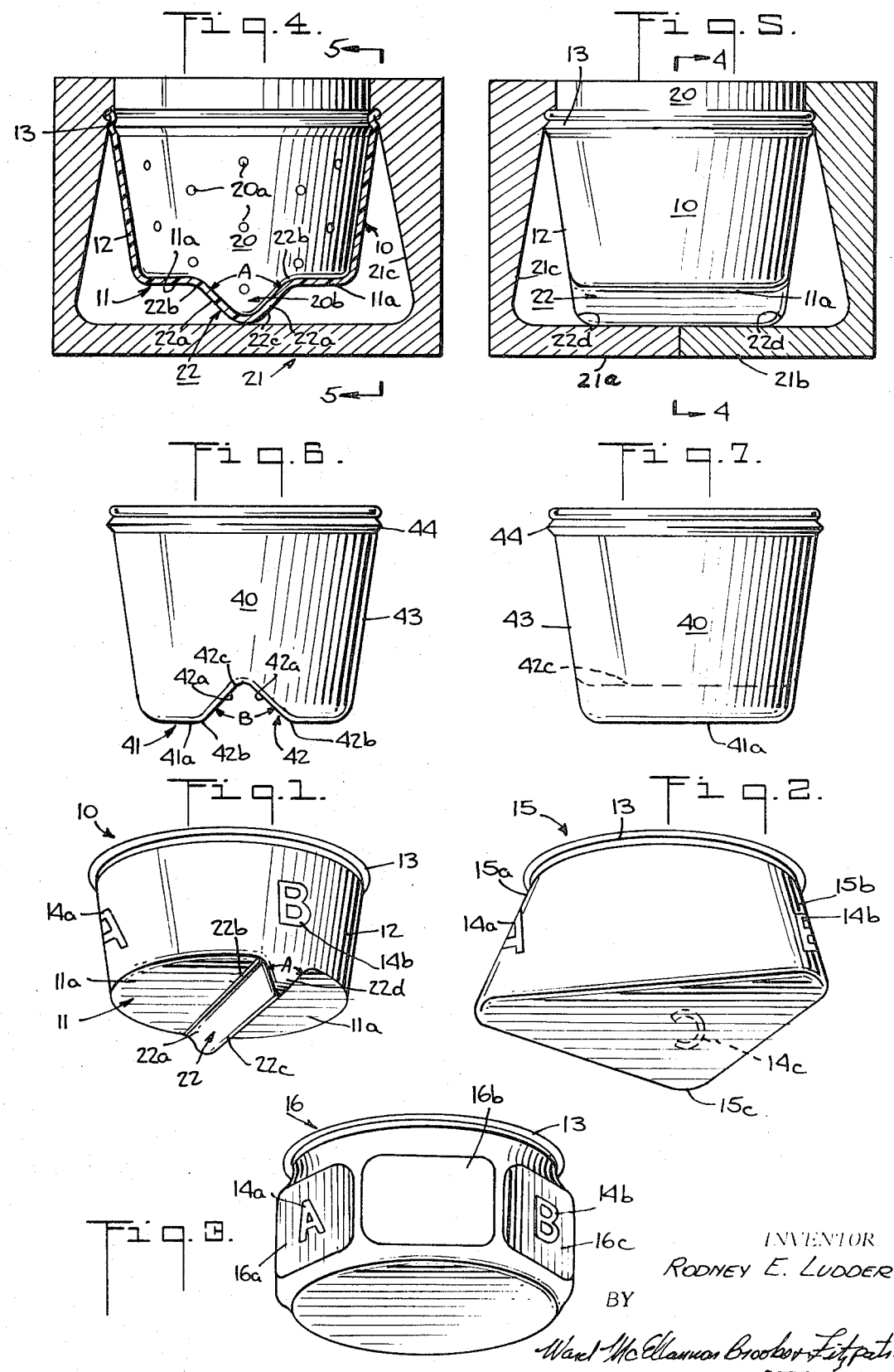

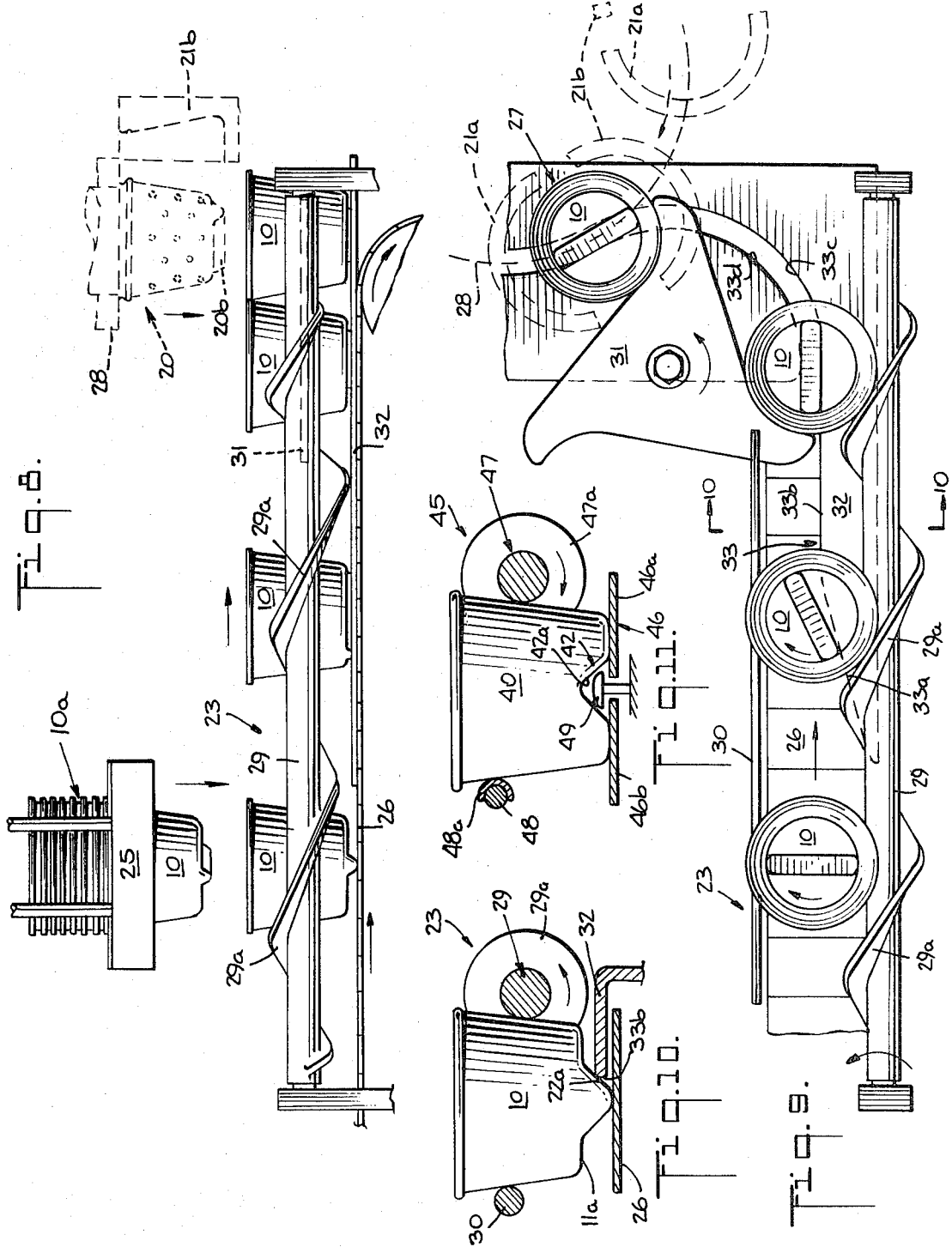

CONTAINER PARISON

This invention relates to techniques for making non-nestable plastic containers from nestable preforms or "parisons" as generally described in copending application Ser. No. 842,839, filed July 18, 1969. More particularly, it relates to a manner in which the parisons can be pivotally oriented to uniformly face in a given direction while feeding them into the final forming machine in which they are blow-molded to their ultimate, non-nestable shape.

As described in detail in the referred to copending application, it is possible to form plastic containers of virtually any desired shape by heating and blow-molding partially formed nestable containers, referred to as "parisons" or "preforms", in a turret-type forming machine which is usually located at a packing plant or the like where the finally formed containers are filled with comestible or other items and sealed for shipment to retail stores and other places. The parisons are received in nested condition from the container manufacturer, and stacks of the parisons are loaded into a dispenser for continuous feeding, one at a time, to the successively passing moldheads of the rapidly rotating forming machine.

For any of several reasons it may be necessary to pre-position each parison so that one of its local surface areas will be aligned with, or otherwise juxtapositioned with respect to a particular surface area of the finish-mold cavity within which it is received in the machine. For example, round nestable parisons may be pre-printed for subsequent blow-molding into polygonal shaped, non-nestable containers whose flat side surfaces will bear particular printed indicia such as trademarks, informative matter, colorful designs, etc. It is apparent that when the finish-mold is closed around the parison for the blowing operation, the appropriate printed surface areas must be pre-positioned to be facing the flat surfaces on the mold cavity which correspond to those surfaces of the finished container on which the indicia will appear. As another example, a localized region of the nestable parison may have enlarged thickness providing supplemental plastic material for the forming of a bulbous projection or the like in the finally shaped, uniformly thick plastic container, and it is obviously essential that the locally thickened area be in juxtaposition with the corresponding local deviation in the finish-mold cavity when the mold is closed around the parison for final blowing to shape.

Considerable difficulty is presented when such orienting and pre-positioning of each parison must be repetitively performed with accuracy at high speed. The handling equipment should effect an essentially positive gripping of each parison for dependability, yet must not be unduly complicated or subject to breakdown for reasons of economy in initial installation and for maintenance-free operation. For simplified job changeover it is preferable that the apparatus should also be usable with parisons which need not be so pre-positioned, or should be easily adaptable for such use. Moreover, the apparatus should not require costly rearrangement or adapting of the blow-molding machine which it feeds, and preferably should be generally similar to conventional machine infeeding apparatus in space, power, maintenance, and other requirements. In addition, the parison itself cannot be altered in such manner as to render it ineffective for, or even to compromise, its intended purpose, or in manner rendering it non-nestable.

It is intended by the present invention to overcome these difficulties, and to satisfy these and other requirements.

In general, the invention provides a modified shape of each parison which, together with a relatively conventional though modified machine feeding apparatus, automatically and in positive manner causes the required pivotal orienting of the parison as it is conveyed from the dispenser discharge location towards the final-forming machine. The mandrel on which the parison is received in each finish-mold of the machine is adapted to accommodate and, as necessary, to finally pre-position the specially shaped parison.

Briefly describing the invention in its preferred formed, the underside of each nestable cup-like parison is formed having an elongated, relatively narrow ridge which is centered on a diametral plane of its circular bottom wall portion, and which engages and aligns with, and is thereupon guided by, a fixed aligning track of the machine feeder conveyor apparatus, all in response to the normal forces of movement exerted on the parison by the feeder conveyor as the parison is moved towards the final-forming machine. In the embodiment to be described, the parisons are dispensed from a nested stack in upright position, one at a time, on to a horizontal feeder conveyor which includes a conveyor of the screw type disposed adjacent and parallel to the path of the parisons, and between whose lands the individual parisons are received and supported. A fixed, horizontally extending guide rail supports the opposite sides of the continuously conveyed parisons. The fixed aligning track extends in slightly raised relation along, and projects laterally across only about one-third of the width of a moving flat plate conveyor which supports the referred to bottom ridges of the parisons as they are carried toward a starwheel for tangential introduction into the rotating forming machine. Rotation of the screw conveyor conveys each parison in lateral direction, urging the bottom ridge of the parison against an angularly disposed lead-in portion of the aligning track to cause the desired pivotal orienting of the parison as its projecting ridge aligns itself with the track. The ridge subsequently follows along the track and the desired orientation is maintained. Of course, the rates of movement of the screw conveyor and flat plate conveyor are synchronized.

The aligning track extends in similar fashion under a starwheel by which the direction of movement of the parisons is changed ninety degrees, but the track is arranged in two parts to guide both sides of the parison ridge as the starwheel transfer is made. The starwheel deposits each properly oriented parison at a pick-up station where it is picked up in a conventional manner and received in one of the heads of the forming machine. The parison is received and supported, by force of vacuum, on a close-fitting, identically shaped mandrel which forms part of the moldhead. At its bottom end the mandrel is configured to closely receive the referred to ridge on the parison, and therefore further incremental pivoting of the parison may occur as it is pressed against the mandrel so that very accurate pre-positioning is assured.

In the preferred embodiment the ridge on the parison is formed by a V-shaped, downward protuberance of its normally flat and thin bottom wall portion, the V-shape being rounded at its apex and having a preferred included angle of ninety degrees. In an alternative embodiment, the parison bottom wall portion is provided with a transversely extending upwardly formed recess or groove-like protuberance of inverted V-shape in cross-section, rather than a downward projection.

These and other objects, features and advantages will become more fully apparent from the following detailed description of the invention, which has reference to the accompanying drawings in which:

FIG. 1 is a perspective view of a nestable plastic parison for use in practicing the invention;

FIGS. 2 and 3 are perspective showings of two containers as may be made from the parison of FIG. 1;

FIGS. 4 and 5 are cross-sectional side and front views, respectively, of the parison as it appears within a finish-mold cavity of a blow-molding machine, FIG. 4 being from lines 4—4 in FIG. 5 and also showing the parison in cross-section, and FIG. 5 being from lines 5—5 in FIG. 4;

FIGS. 6 and 7 are, respectively, a side view and a front view of a modified form of parison;

FIGS. 8 and 9 are, respectively, a side elevation and a top plan view of apparatus by which the parison of FIG. 1 is pivotally oriented as it is fed towards a molding machine, certain moldhead parts of which are shown diagrammatically in phantom;

FIG. 10 is an elevational view of the apparatus from lines 10—10 in FIG. 9; an

FIG. 11 is an illustration, similar to that of FIG. 10, of a modified form of feeder conveyor for orienting and guiding the modified parison of FIGS. 6 and 7.

Referring first to FIG. 1, a nestable, generally cup-shaped, all-plastic "preform" or "parison" for use in accordance with the invention is generally indicated by reference numeral 10. It is thermoformed from polypropylene, polyethylene, polystyrene, polyvinyl chloride, or similar thin thermoplastic material, and in the embodiments to be described has round, tapered shape. But, whether or not round, it is nestable with other like parisons for less bulky and therefore more convenient shipment to a place where it will ultimately be converted, by final blow-molding, to a container of any desired shape such as that of either of the non-nestable containers 15 or 16 illustrated in FIGS. 2 and 3.

The parison 10 has a bottom wall portion generally indicated by reference numeral 11, which generally defines a bottom surface plane 11a. and a sidewall portion 12 which tapers upwardly and outwardly from the bottom wall portion 11 to termination at its upper end in a mouth rim portion 13. A printed product identification, trademark, colorful design, or other indicia 14a, 14b, etc. appears on its sidewall portion 12 at appropriate circumferentially spaced apart locations which correspond with the same numbered locations on respective predetermined local surface areas of the finished container. For example, the respective indicia 14a, 14b, etc. may be located on the parison so as to appear on the upwardly sloping apex edges 15a, 15b, 15c of the ultimately formed, triangular-shaped container 15 illustrated in FIG. 2, or to appear on the alternate of the flat sidewall surfaces 16a, 16b, 16c etc. of the finally formed hexagonal shaped container 16 illustrated in FIG. 3.

As illustrated in FIGS. 4 and 5, the parison 10 will be received in the final forming machine on a heated mandrel 20 within a finish-mold 21 whose mold halves 21a, 21b are closed about the parison. The parison is heated to a temperature at which it becomes thermoplastic and is thereupon blow-molded to its final, radially expanded shape. The mandrel 20 has vacuum and blow-air openings 20a throughout its surface area, vacuum being initially applied at these openings for the purpose of holding the parison 10 in firm, contiguous contact with the heated surface area of the mandrel for rapid and even heating of the plastic to its blow-molding temperature, and blow-air being subsequently emitted through the same openings 20a to finally expand the parison 10 to the interior shape of the mold cavity 21c.

To ensure that the printed indicia 14a, 14b, etc. will appear at the respective desired locations 15a-c or 16a-c of the finished container, it is necessary that the indicia be facing in a particular direction as the parison is received in the finish-mold cavity. That is, in view of the fixed position on the machine of the mandrel 20 and mold 21, the parison must be pivotally oriented and thereby pre-positioned so that the indicia will face those interior surfaces of the mold cavity 21c which correspond with the respective surfaces of the finished container on which the indicia will appear. It is apparent that the pre-positioning of the parison should be as accurate as possible for accurate centering of the indicia on the desired surfaces, and that operating economy requires the final-forming operation to be performed continuously on large numbers of parisons at the highest possible speed. It is therefore also apparent that the necessary pivotal orienting of each of the plurality of continuously fed parisons must be repetitively and reliably performed at commensurately high speed.

For these purposes, and as best seen in FIGS. 1, 4 and 5, the bottom wall portion 11 of the parison 10 is formed having a downward protuberance 22 providing a ridge extending transversely thereacross at its middle. The elongated protuberance 22 has generally V-shaped cross-sectional configuration as more clearly seen in FIG. 4, its flat side surfaces 22a being respectively merged with the flat surfaces of the bottom wall portion which form the bottom surface plane 11a by respective wide-radius fillets 22b, and being merged together at the downwardly facing apex of the V-shape by the relatively wide radius curvature 22c. As shown in FIGS. 1 and 5, the respective ends of the V-shape are closed by downward extensions of the sidewall portions 12, which are smoothly curved as at 22d.

In the preferred embodiment, the included angle "A" between the flat side surfaces 22a of the V-shape is 90°. Although a lesser or greater included angle might be employed, it appears that the 90° included angle is small enough to cause the side surfaces 22a to face generally in lateral direction as is desired for pivotally manipulating the parison, yet large enough so that the lines of juncture between the rather widely angulated, intersecting planar surfaces on the parison bottom are not sharp and therefore readily disappear in the final forming operation.

The bottom ridge or protuberance 22 is used to pivotally orient the parison 10 in manner as will now be described with particular reference to FIGS. 8-10, which illustrate a machine feeding arrangement by which the parisons 10 are dispensed one-at-a-time from nested stacks thereof and sequentially fed to the respective moldheads of a turret-type blow-molding machine.

As indicated in FIG. 8, a nested stack 10a of the parisons 10 is loaded bottomside down in a dispenser 25, which is of a conventional type used in dispensing containers one-at-a-time therefrom. The randomly oriented parisons 10 are sequentially dispensed to a feeder conveyor apparatus, generally indicated by reference numeral 23. In the illustrated embodiment the parisons are dropped on to a flat plate type conveyor 26 which supports the bottoms thereof as they are moved in lateral direction, as indicated by the arrow, towards a pickup station generally indicated by reference numeral 27 (FIG. 9) at which each is received in an individual moldhead of the final-forming machine which is shown only in phantom and indicated generally by reference numeral 28. As best seen in FIGS. 9 and 10, the parisons 10 are supported in upright position on the conveyor 26 between a horizontally disposed feed screw 29 of a screw conveyor along one side of the parisons and a fixed guide rail 30 disposed along the opposite side of the row of parisons. The spacing between the parallel-extending feed screw 29 and the guide rail 30 is adjusted appropriately for the purpose. As the individual parisons are dropped on to the conveyor 26 they are received between the screw conveyor lands 29a by which their separation is maintained as they are moved in lateral direction. In the particular conveying arrangement shown, the starwheel 31 alters the direction of feeding of the parisons by substantially 90° prior to their introduction into the machine 28, although such transfer may be unnecessary in other conveying arrangements. In addition, the pickup of each parison 10 is effected by downward movement of the mold mandrel 20, as indicated by the arrow in FIG. 8, although it will be understood that pickup may also be effected in different manner, such as by lifting each parison into engagement with a mandrel at fixed elevation on the machine 28, through the use of an intermittently movable, vertical lift plate (not shown) at the pickup station 27. Of course, the pitch of the feed screw 29 which determines the distance of separation between sequential parisons, as well as its speed, and the speed of rotation of the machine 28, that of the starwheel 31, the rate of movement of the conveyor 26, and the timing of the vertical movement of either the machine mandrel 20 or, alternatively, any vertical lift plate (not shown) at the pickup station 27, must be synchronized, as will be apparent.

As the parisons 10 are moved in lateral direction by the feed screw 29 and conveyor 26 towards the parison pickup station 27, the downwardly projecting protuberance 22 of each parison is moved against the angular lead-in track portion 33a of a fixed aligning track 32 which extends horizontally in the direction of movement of the parisons. The lead-in portion 33a is part of a laterally facing track surface 33, and is disposed at an angle of 15° with respect to the direction of travel of the parisons, as shown in FIG. 9. As will be best understood from FIGS. 9 and 10, the tendency of one of the laterally facing side surfaces 22a of the parison protuberance to contiguously align itself with the track surface 33 induces the desired pivotal movement of the parison. The track surface portion 33b retains the now pivotally oriented alignment of each parison 10 as it travels towards the pickup station 27. It will be noted, especially from FIG. 10, that this track portion projects inwardly from the side of the conveyor 26 a distance which is appropriate to receive the parison side surface 22a in sliding engagement, and that the height of the track 29 above the conveyor 26 is less than the height of the parison protuberance 22 so that the parison bottom portion at its bottom surface plane 11a clears the top of the track during the movement.

As seen in FIG. 9, a curved track portion 33c of the alignment track guides and maintains the desired orienting of each parison 10 as the latter is received and redirected by the starwheel 31. An oppositely facing track portion 33d guides the opposite side surface 22a of the parison protuberance 22 during the directional transfer movement. When the parison reaches the parison pickup station 27, one of the machine head mandrels 20 of the synchronously revolving machine 28 is lowered into the parison, whereupon vacuum applied through the mandrel openings 20a draws the parison on to the mandrel which carries it away.

As seen in FIGS. 4 and 8, the mandrel 20 has a downwardly projecting portion 20b against which the parison protuberance 22 is seated as the parison is picked up by the mandrel. Since the mandrel 20 is stationary with respect to the machine 28 to which it is attached, its projecting portion 20b is precisely oriented with respect to any localized special configuration on the surrounding mold cavity 21c, which is also stationary. As the parison is drawn on to the mandrel by vacuum applied through the mandrel orifices 20a, some incremental pivotal orienting of the parison 10 occurs as its bottom protuberance 22 seats against the conforming shape of the mandrel bottom projection 20b.

The modified form of parison 40 as shown in FIGS. 6 and 7 is pivotally oriented in similar manner as it is fed into a final-forming machine. Referring first to FIGS. 6 and 7, its otherwise flat bottom wall portion 41 generally defines a bottom surface plane 41a and has an upwardly projecting protuberance 42 which extends thereacross. As in the embodiment of FIGS. 1, 4 and 5, the included angle "B" between its generally lateral facing flat sides 42a is preferably 90°. The apex edge 42c of the inverted V-shaped protuberance, as well as the horizontally extending lines of juncture 42b at the flat bottom surfaces which form the bottom surface plane 41a, are smoothly curved or rounded as indicated. Of course, the parison 40 also has a sidewall portion 43 which tapers upwardly and outwardly from the bottom wall portion 41, an open mouth rim portion 44 being formed at its upper end. Although not fully illustrated, it will be understood from FIG. 11 that the parison 40 may also be pivotally oriented while it is being fed towards a final-forming machine by a feeder conveyor, generally indicated by reference numeral 45. As does the previously described feeder conveyor 23, the conveyor 45 includes a flat plate conveyor 46 which supports the undersides of the parisons, and a screw conveyor having a feed screw 47 is disposed along one side of the single file parisons being fed. A fixed guide rail 48 is disposed parallel to the feed screw 47 at the opposite side of the parisons.

To facilitate fixed mounting of an upwardly projecting, parison aligning track 49 which extends along the centerline of the conveyor 46, the flat plate conveyor 46 may be formed in two laterally spaced apart side section 46a, 46b as shown, although other track support arrangements might be used. The width of the aligning track 49 is sufficiently narrow to be received in the groove formed by the upward protuberance 42 of the parison 40, as seen in FIG. 11. The parisons 40 are dispensed one-at-a-time from a dispenser similar to dispenser 25 (FIG. 8) on to the conveyor 46, and are received between the lands 47a of the feed screw 47 and the fixed guide rail 48.

Each parison 40 is moved in lateral direction by the feed screw 47 and conveyor 46, and pivotal orienting of the parison is promoted not only by the urging of the parison against aligning track 49, but also by the pivotal rotation effect imparted to the parison by the feed screw 47 and the retardation effect, on the opposite side of the parison, of a slip resistant coating 48a on the fixed guide rail 48. That is, as seen in FIG. 11 the direction of rotation of the feed screw 47 and the direction of threading of its lands 47a are such as to tend to pivot the parison 40 in counterclockwise direction as the conveyor 47 imparts lateral movement to the parison. The tendency for such counterclockwise pivotal movement to occur is augmented by the slip-resistant nature of the guide rail surface 48a, and it is apparent that orienting of the parison is attained when the groove formed by its upward protuberance 42 seats on, and is guided along the fixed guide track 49. The parison 40 is thus pivotally oriented and conveyed towards a machine pick-up station (not shown) in manner generally as previously described in connection with FIGS. 8 and 9. Although not illustrated, the machine mandrel 20 is grooved transversely to receive the upward protuberance 42 so as to impart final incremental pivoting of the parison 40 as it is received in the final-forming machine.

Either of the parison 10 or 40 may be blow-molded by the machine 28 to one of the final shapes as illustrated in FIGS. 2 or 3. Of course, in the embodiments shown and described the circumferential location of printed indicia 14a-c on the parison corresponds with either direction of final orienting of the elongated parison protuberance 22 (or 42) so that no reversed orienting is possible regardless of the initially random positioning of the parisons in the parison dispenser. However, where the relative positioning of the indicia with respect to a particular surface of the finished container is such that opposite or reversed orienting cannot be tolerated, the nested stacks of parisons may be partially pre-positioned by hand as they are loaded into the dispenser, such that any selected indicia will always face in one direction when finally oriented on the conveyor 23 (or 45).

The parison protuberance 22 or 42 will also be found useful for properly positioning the parison for the printing thereon of the indicia 14a, 14b, 14c so that it will be correctly and accurately located on the proper surface of the subsequently expanded container. For example, in offset printing of the cup-shaped parisons, the protuberances 22 or 42 provide laterally facing ridges by which the parisons may be pivotally oriented and accurately seated on the cup-printing mandrels of the printing machine, thus pre-positioning each parison immediately prior to the application of the print.

Thus, a technique has been described, including specially shaped parisons and specially adapted apparatus, for pivotally orienting the parisons to face in a particular direction as they are fed towards and into a final blow-molding machine, which achieves all of the objects of the invention.

What is claimed is:

1. A parison or preform of thermoplastic material, comprising a bottom wall portion generally defining a bottom surface plane, a peripherally extending sidewall portion extending vertically upward from said bottom surface plane and terminating at its upper end in a mouth rim portion, and exterior surface means of said bottom wall portion projecting vertically from said bottom surface plane and defining generally lateral facing edge means providing a straight-line slide path extending across said bottom wall portion and beyond said sidewall portion at either side of said bottom wall portion for pivotally orienting said parison, said parison being nestable with other like parisons.

2. A parison according to claim 1, wherein said surface means which defines said generally lateral facing edge means comprises means defining an elongated ridge of said bottom wall portion.

3. A parison according to claim 2, wherein said elongated ridge comprises a protuberance of said bottom wall portion below said bottom surface plane, said protuberance extending at least part way across said bottom wall portion.

4. A parison according to claim 3, wherein said protuberance is substantially V-shaped, said V-shape having an included angle of substantially 90°, the apex edge of said V-shape and the respective lines of juncture between said V-shape and the remainder of said bottom wall portion each being rounded.

5. A parison according to claim 2, wherein said elongated ridge comprises a protuberance of said bottom wall portion above said bottom surface plane.

6. A parison according to claim 5, wherein said protuberance is substantially V-shaped, said V-shape having an included angle of substantially 90°, the apex edge of said V-shape and the respective lines of juncture between said V-shape and the remainder of said bottom wall portion each being rounded.

* * * * *